United States Patent
Hicks et al.

(10) Patent No.: US 6,533,300 B1
(45) Date of Patent: Mar. 18, 2003

(54) TRAILING TWIST AXLE AND METHOD OF MANUFACTURE

(75) Inventors: Timothy M. Hicks, West Bloomfield, MI (US); Daniel E. Jennings, Birmingham, MI (US)

(73) Assignee: Oxford Suspension, Inc., Troy, MI (US)

(*) Notice: Subject to any disclaimer, the term of this patent is extended or adjusted under 35 U.S.C. 154(b) by 0 days.

(21) Appl. No.: 09/586,136

(22) Filed: Jun. 2, 2000

(51) Int. Cl.⁷ ............................................. B60G 21/05
(52) U.S. Cl. ......................... 280/124.106; 280/124.166
(58) Field of Search ....................... 280/124.1, 124.106, 280/124.128, 124.153, 124.164, 124.166; 267/273; 301/124.1

(56) References Cited

U.S. PATENT DOCUMENTS

| | | | |
|---|---|---|---|
| 842,397 A | * | 1/1907 | Friedman .................. 301/124.1 |
| 1,019,998 A | * | 3/1912 | Thayer ..................... 301/124.1 |
| 3,410,575 A | | 11/1968 | Turnbull et al. |
| 4,033,609 A | | 7/1977 | Malcolm |
| 4,094,532 A | | 6/1978 | Johnson et al. |
| 4,406,479 A | | 9/1983 | Chalmers |
| 4,429,900 A | | 2/1984 | Feher |
| 4,486,030 A | | 12/1984 | Takata et al. |
| 4,616,849 A | | 10/1986 | Matsumoto et al. |
| 4,623,164 A | | 11/1986 | Cassel et al. |
| 4,637,628 A | | 1/1987 | Perkins |
| 4,700,796 A | | 10/1987 | Morlok et al. |
| 4,750,757 A | | 6/1988 | Long |
| 4,765,650 A | | 8/1988 | Kameshima et al. |
| H518 H | | 9/1988 | Gentiluomo |
| 4,946,189 A | | 8/1990 | Manning |
| 5,215,329 A | | 6/1993 | Santo |
| 5,277,450 A | | 1/1994 | Henschen |
| 5,324,073 A | | 6/1994 | Alatalo et al. |
| 5,366,237 A | | 11/1994 | Dilling et al. |
| 5,409,254 A | | 4/1995 | Minor et al. |
| 5,409,255 A | * | 4/1995 | Alatalo et al. ........ 280/124.166 |
| 5,507,518 A | | 4/1996 | Nakahara et al. |
| 5,518,265 A | | 5/1996 | Buthala et al. |
| 5,520,407 A | | 5/1996 | Alatalo et al. |
| 5,597,175 A | | 1/1997 | Tuan |
| 5,632,504 A | | 5/1997 | Gallagher |
| 5,673,929 A | | 10/1997 | Alatalo |
| 5,718,445 A | | 2/1998 | VanDenberg |
| 5,800,024 A | | 9/1998 | Steimmel et al. |
| 5,882,031 A | | 3/1999 | VanDenberg |
| 6,099,084 A | * | 8/2000 | Bungarten et al. .......... 301/127 |

FOREIGN PATENT DOCUMENTS

| | | |
|---|---|---|
| DE | 27 40 948 | 3/1979 |
| DE | 37 30 334 | 3/1989 |
| EP | 0 452 835 A1 | 10/1991 |
| GB | 652269 | 4/1951 |
| GB | 1276721 | 6/1972 |
| GB | 2241209 A | 8/1991 |
| JP | 62-247914 | 10/1987 |

* cited by examiner

*Primary Examiner*—Paul N. Dickson
*Assistant Examiner*—Faye M. Fleming
(74) *Attorney, Agent, or Firm*—Dykema Gossett PLLC

(57) ABSTRACT

A rear suspension having an axle with a generally U-shaped or V-shaped twist beam is provided. The twist beam on its extreme ends is penetrated by the corresponding control arms. The control arms of the present invention penetrate through apertures provided into the twist beam. The first and second walls of the twist beam are brought toward one another to allow the control arm to penetrate through the respective first and second apertures provided in the walls of the twist beam. After insertion through the walls of the twist axle, the twist axle is allowed to angularly expand again to its free state wherein it locks the twist beam to the control arm. A slight weld may be added to further ensure the connection of the control arm to the twist beam.

14 Claims, 2 Drawing Sheets

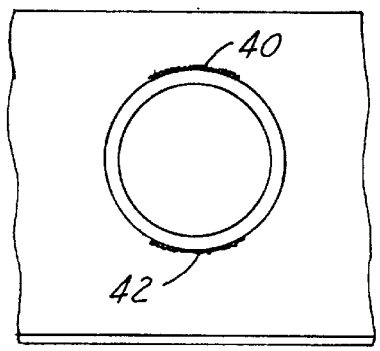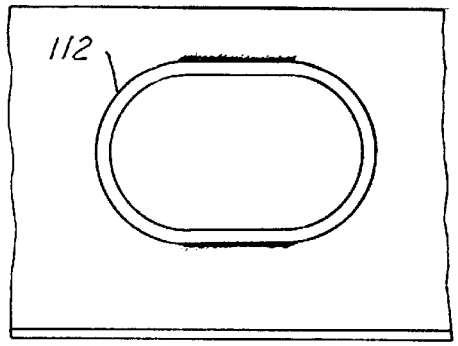
FIG. 4    FIG. 5
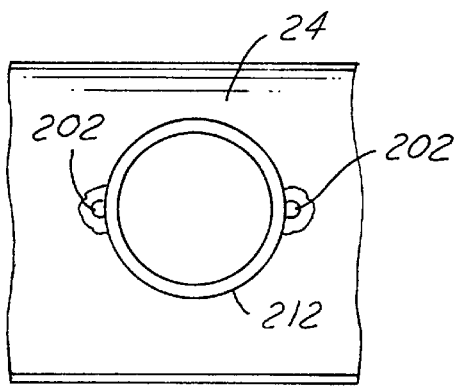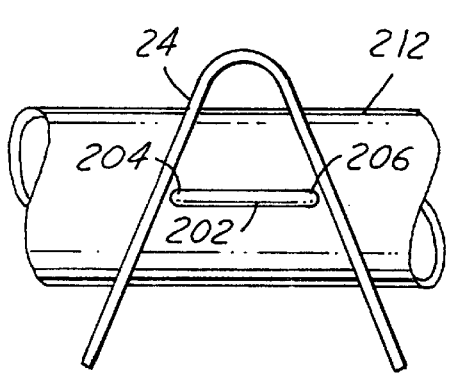
FIG. 6    FIG. 7
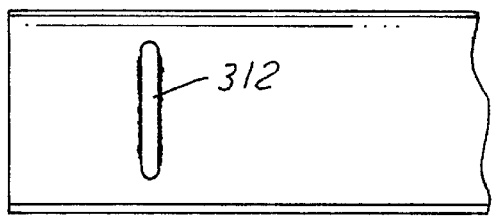
FIG. 8
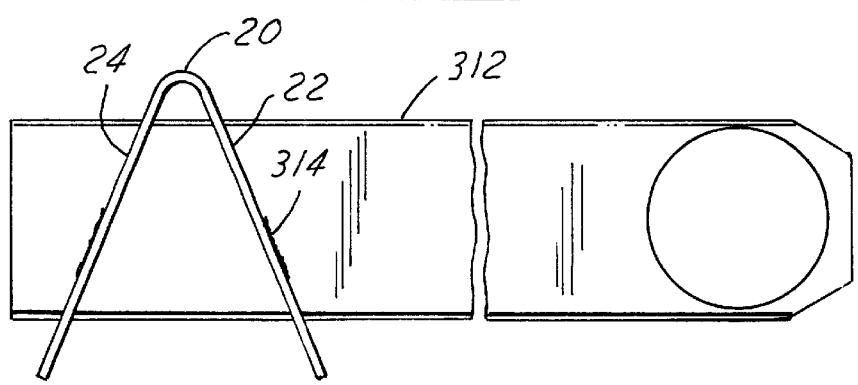
FIG. 9

TRAILING TWIST AXLE AND METHOD OF MANUFACTURE

FIELD OF THE INVENTION

The present invention is in the field of axle assemblies for rear suspensions of front wheel drive motor vehicles. More particularly, the invention relates to an inventive connection of a rear suspension axle assembly twist beam to a control arm and a method of manufacture thereof.

BACKGROUND OF THE INVENTION

One type of axle assembly commonly used in the rear suspension of front wheel drive vehicles is commonly referred to as a trailing twist axle or simply a twist axle. Twist axles are mounted to the underside of a vehicle at a pair of bushings. The bushings are typically disposed at extreme ends of an axle arm. The axle arms are also commonly referred to as the control arms. The control arms typically extend rearward from the bushings. The bushings define an axle pivot axis about which the rear axle assembly pivots after being mounted to the vehicle. A transverse beam connects the two parallel spaced control arms.

The transverse beam is commonly referred to as a twist beam. The twist beam is resistant to bending but resilient relative to torsional stress. Many twist beams are profiled in the shape of an inverted U having first and second sides. The inverted U design raises the torsional deflection axis of the twist beam relative to a closed tube.

The control arms along their rearward ends typically have connected thereto a spring seat. The spring seat is provided on the control arm to support a suspension coil spring which is disposed between the vehicle body and the control arm. A shock absorber having one end attached to the control arm and a second end attached to the vehicle body is usually mounted near the coil spring. Depending upon the structure of the control arms, a transversely oriented track bar may or may not be placed between the control arm and the vehicle body to laterally stabilize the axle assembly. Depending on the desired torsional stiffness of the axle assembly, the axle assembly may or may not have a transversely extending stabilizer bar disposed within or in close proximity to the twist beam.

Each control arm has connected thereto a spindle mounting plate. The spindle mounting plate can be part of the spring seat or can be optionally located elsewhere, separate from the spring seat. A spindle assembly is mounted to each of the spindle mounting plates. Each spindle assembly typically includes a spindle and a unitary flange for mounting to the spindle mounting plates. The spindle is fixed relative to the spindle mounting plate. A wheel bearing is disposed over the spindle. A rotating brake element such as a brake drum or brake disk turns on a wheel bearing mounted on the spindle by way of the wheel bearing. A wheel is mounted to the rotative brake elements for unitary rotation therewith.

Typically the control arms are welded to the extreme ends of the twist beam. The weld between the twist beam and the control arm is one of, if not the, most critical welds of the axle assembly. Typically, each end of the twist beam is stamped to mate around a respective control arm on the end board surface of the control arm only. The above noted construction requires a constant fit-up and nearly perfect weld. Any weld deficiencies or fit-up gap variation can dramatically impact the fatigue life of the axle assembly. In addition, if the twist beam/control arm weld should fail, the control arm may separate from the twist beam. It is desired to provide a rear axle assembly having a twist beam and control arm connection which lowers the cost of fabrication and achieves a high strength reliable joint between the twist beam and control arm. It is further desirable to provide a method of connecting the twist beam to the control arm wherein the control arm is retained to the twist beam even if there has been a failure in a connective weld between the twist beam and control arm. It is also a desire to provide a twist beam control arm connection which is more forgiving in fit-up variation.

SUMMARY OF THE INVENTION

To satisfy the above-noted and other desires, the revelation of the present invention is brought forth. In a preferred embodiment the present invention provides a rear suspension having an axle with a generally U-shaped or V-shaped twist beam. The twist beam on its extreme ends is penetrated by the corresponding control arms. The control arms of the present invention penetrate through apertures provided into the twist beam. The first and second walls of the twist beam are brought toward one another to allow the control arm to penetrate through the respective first and second apertures provided in the walls of the twist beam. After insertion through the walls of the twist axle, the twist axle is allowed to angularly expand again to its free state wherein it locks the twist beam to the control arm. A slight weld may be added to further ensure the connection of the control arm to the twist beam.

BRIEF DESCRIPTION OF THE DRAWINGS

FIG. 4 is a front sectional view illustrating the connection between the control arm and the twist beam as shown in FIGS. 1 through 3 in the direction of arrow 4 in FIG. 3.

FIG. 5 is an alternate preferred embodiment axle assembly with a view similar to that of FIG. 4 illustrating a control arm which has a non-constant radius tubular member.

FIG. 6 is a view similar to that of FIG. 4, illustrating an alternate preferred method of ensuring connection between the twist beam and the control arm.

FIG. 7 is a side elevational view of the twist beam control arm connection shown in FIG. 6 with the twist axle.

FIG. 8 is a view similar to that of FIG. 4, illustrating an alternate preferred embodiment control arm of a vertical plate control arm.

FIG. 9 is a side view of the axle assembly shown in FIG. 8.

DETAILED DESCRIPTION OF THE PREFERRED EMBODIMENTS

Figure 1:
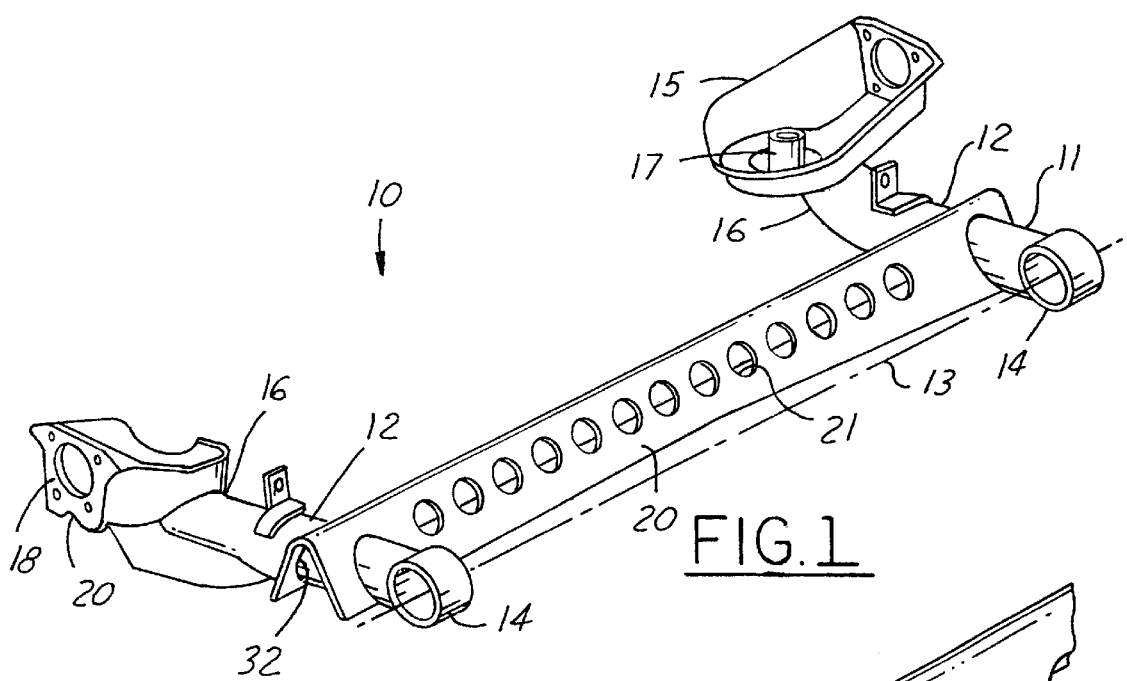
FIG. 1 is a perspective view of a preferred embodiment rear axle assembly according to the present invention.

FIG. 1 illustrates a twist axle assembly 10. The axle assembly 10 is mounted to the underbody of a vehicle body (not shown) at a pair of pivot points defined by bushings (not shown). The bushings are typically disposed at a forward or leading end 11 of control arms 12 in tubular bushing sleeves 14. The control arms 12 typically extend rearward from the bushing sleeves 14. The control arms 12 extend generally parallel to the longitudinal axis of the vehicle and are parallel spaced from one another. The bushings define an axle assembly pivot axis 13 about which the axle assembly pivots after being mounted in the vehicle body. A transverse twist beam 20 connects the control arms 12. The twist beam 20 extends generally parallel to axis 13 and transverse to the longitudinal axis of the vehicle. A spring seat 15 is commonly provided on a rearward end 16 of control arm 12 support a suspension coil spring (not shown) disposed between the vehicle body and the spring seat 15. A spring mount 17 laterally stabilizes the coil spring. A shock absorber (not shown) has one end attached to the control arms 12 and a second end attached to the vehicle body. Depending on the structure of the control arms 12, a transversely oriented track bar may or may not be placed between the axle assembly and the vehicle body to laterally stabilize the axle assembly 10. Depending on the desired torsional stiffness of the axle assembly 10, the axle assembly 10 may or may not have a transversely extending stabilizer bar disposed within or in close proximity to the twist beam 20. The stabilizer bar, if employed, can be of a desired torsional stiffness established by vehicle design criteria.

Each side of the axle 10 has a spindle mounting plate 18. Although the spindle mounting plates 18 are shown in the accompanying figures as forming part of the spring seats 15, they can be located elsewhere, such as at the ends of a transverse beam, separate from the spring seats. A spindle assembly (not shown), which includes a spindle, a spindle axis and a wheel bearing, is mounted to each of the spindle plates 18. A rotative brake element (not shown), such as a brake drum or brake disc, is in turn rotatably mounted to the spindle through the wheel bearing. A wheel (not shown) is also mounted to the rotative brake element for rotation about the spindle. Because the wheels are mounted, albeit indirectly, to the spindle plates 18, the spindle plates 18 must be made at the desired alignment angles for the vehicle rear suspension. Also, features on the spindle plates 18 which locate the spindle assemblies thereon must be aligned so that, when mounted, the spindles are axially aligned with each other. The location of the axis of alignment between the spindles is virtually parallel to the pivot axis 13 of the axle assembly as defined by the sleeves 14 of the bushings, so as to aid in ensuring wheel alignment. The axle assembly 10 has V-shaped notches 20, or more simply put, V notches in a lower side which are beneficial in achieving a desired axle assembly to vehicle body alignment.

Figure 2:
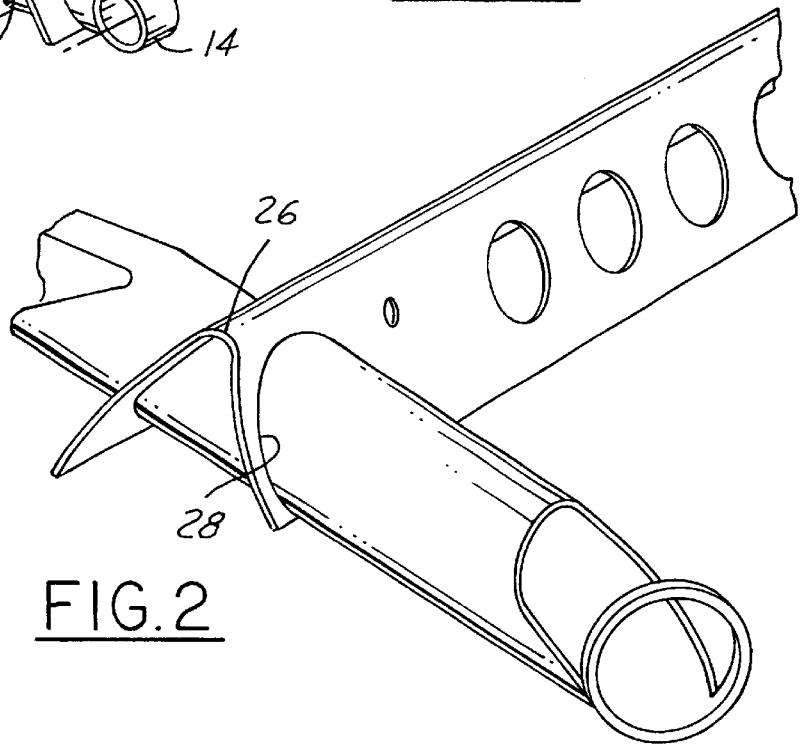
FIG. 2 is an enlargement of a portion of the rear axle assembly shown in FIG. 1 illustrating the connection of a control arm with a twist beam.
Figure 3:
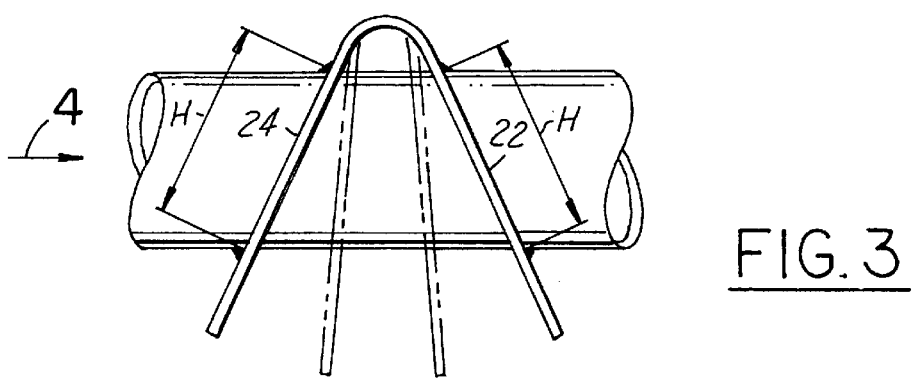
FIG. 3 is a side elevational view of the portion of the rear axle assembly shown on FIGS. 1 and 2.

Referring additionally to FIGS. 2 and 3, the twist beam 20 is generally shaped as an inverted V, having a first or front wall 22 and a second or rear wall 24. Adjacent its extreme ends 26, the twist beam first wall has an aperture 28 which extends therethrough. Generally aligned with the aperture 28 is an aperture 32 which extends through the second wall 24 of the twist beam. The twist beam 20 is made from 980 HSLA 9 mm gauge or similar sheet steel which has been stamped or pressed to assume its inverted V-shape. A series of apertures 21 in the twist beam 20 are provided to decrease the weight of the axle 10 assembly while maintaining very high bending strength characteristics in the twist beam 20. An angle between the first and second walls 22 and 24 is typically in the neighborhood of 45 to 90 degrees.

Referring additionally to FIG. 4, the control arm 12 which is inserted into apertures 28 and 32 is a constant radius tubular member typically having a wall thickness of ⅜ inch made from 950 HSLA or similar steel. A typical outside radius will be 3 inches diameter. To assemble the control arm 12 to the twist beam, the first and second walls 22 and 24 of the twist beam are folded or urged toward each other to a more nearly parallel position as shown in phantom in FIG. 3. The control arm 12 is then passed through the apertures 28 and 32 of the first and second walls 22 and 24, respectively, of the twist beam 20. Apertures 28 and 30 are approximately equal in width to the control arms 12. However, with the V-shaped twist beam 20, apertures 28 and 30 must be more elongated in height H than the control arms 12 are high, as walls 22 and 24 are not at right angles with control arms 12. It should be appreciated that the values of height H for walls 22 and 24 are the same only if both walls 22 and 24 are at the same angle to control arms 12. By making the height H slightly smaller than that needed to accommodate control arms 12 when walls 22 and 24 are in their undeflected condition, walls 22 and 24 lockingly engage control arms 12 when walls 22 and 24 are released from the positions shown in phantom in FIG. 3. Walls 22 and 24 engage control arms 12, preventing them from completely returning to their undeflected positions. The locking effect can be supplemented by providing bulges in the control arms 12 fore and aft of the walls 22 and 24, or alternatively necking down control arms 12 proximate to where arms 12 are engaged by walls 22 and 24. As will be obvious to those skilled in the art, this procedure must occur before the bushing sleeve 14 is welded to the control arm 12. After the aforementioned insertion of the control arm 12 into the apertures 28, 32 in the twist beam 20, the twist beam 20 is released allowing the walls 22 and 24 to radially extend outward from one another causing the control arm to be mechanically locked to the twist beam. Partial weld seams 40 and 42 weldably connect the control arm 12 to the twist beam 20 to ensure connection and to prevent any possible rattling between the parts.

Referring to FIG. 5, an alternate preferred embodiment connective arrangement of the present invention is brought forth. The control arm 112 of FIG. 5 has a semi-oval or non-constant radius cross-sectional shape. The control arm 112 shape is connected with the twist beam 20 through corresponding shaped apertures through walls 22 and 24. An additional advantage of the control arm 112 shape is that the control arm 112 is further restrained from any torsional movement with respect to the twist beam 20. Although a semi-oval shape is illustrated in FIG. 5, it will be apparent to those skilled in the art that other non-constant radius shapes can also be utilized to take advantage of this aspect of added torsional rigidity of the control arm.

FIGS. 6 and 7 illustrate an alternate preferred embodiment of the present invention wherein a weld bead 202 is added to both sides of a control arm 212. In one embodiment, the weld bead is added after the control arm 212 is inserted within the apertures 28 and 32 provided in the twist beam 20. In another embodiment, slots or notches in wall 20 or 24 of twist beam 20 receive beads 202, enabling arm 112 to be received by aperture 28 or 32. Once beads 202 have been received, the control arms 212 are rotatively indexed so that beads 202 are no longer in alignment with the notches. Weld bead 202 prevents any axial slippage of the control arm within the twist beam by contact with its extreme ends 204 and 206 with the first 22 or second 24 wall of the twist beam. It should be appreciated that this arrangement would be most effective if the walls 22 and 24 are parallel, as with a U-shaped twist beam instead of the V-shaped twist beam 212.

FIGS. 8 and 9 illustrate yet another alternate preferred embodiment connective arrangement of the present invention. In the embodiment of the present invention shown in FIGS. 8 and 9, the control arm 312 is a blade type control arm, and is fabricated from a generally flat plate of steel which is generally oriented in a vertical plane in the twist beam 20. A fillet weld 314 is utilized to connect the control arm 312 to the twist beam 20, after the control arm 312 has been inserted through matching apertures or slots in the first and second walls of the twist beam.

Yet alternatively, the twist beam 20 is provided with axially extending peripheral lips surrounding apertures 28 and 32. The lips are crimped around the control arms 12 to fix the parts together.

As will be apparent to all those skilled in the art, the failures of the weld mounts in any of the embodiments shown in FIGS. 1 through 9 will still cause the control arms 12, 112, 212, or 312 to be captured with the twist beam 20.

Although preferred embodiments of this invention have been disclosed, it should be understood that a worker of ordinary skill in the art would recognize certain modifications which would come within the scope of this invention. For that reason, the following claims should be studied in order to determine the true scope and content of this invention.

We claim:

1. A motor vehicle rear axle assembly comprising:

a twist beam having one of a U-shape and a V-shape with a first wall and a second wall for extension in a direction generally transverse to a longitudinal axis of a vehicle;

first and second control arms extending generally parallel with said vehicle longitudinal axis, said control arms being generally parallel spaced from one another, said control arms being fixably connected with said twist beam generally adjacent opposite extreme ends of said twist beam; and said control arms being adapted for pivotal connection along an extreme end with said vehicle and at least one of said trailing control arms extending through and being encircled by said twist beam first and second walls.

2. A motor vehicle rear axle assembly as described in claim 1, wherein said control arms are tubular.

3. A motor vehicle rear axle assembly as described in claim 2, wherein said tubular control arms have a non-constant radius.

4. A motor vehicle rear axle assembly as described in claim 3, wherein said tubular control arms have a generally semi oval cross-section.

5. A motor vehicle rear axle assembly as described in claim 1, wherein said control arms are mainly formed from a plate oriented vertically.

6. A motor vehicle rear axle assembly as described in claim 1, wherein said control arms are mechanically locked to said twist beam.

7. A motor vehicle rear axle assembly as described in claim 6, wherein said first wall and said second wall each have first and second apertures receiving said first and second control arms respectively and said twist beam is V-shaped and said first and second receiving apertures are sized so that when said first and second walls are elastically deflected toward a parallel position the apertures are able to receive the control arm and the mechanical locking of the control arms is achieved when the walls are returned to a free condition.

8. A motor vehicle rear axle assembly as described in claim 1, wherein said control arms are mechanically locked to said twist beam by a weld mount along said control arms between the first and second walls of said twist beam.

9. A motor vehicle rear axle assembly, as described in claim 7, wherein said control arms are additionally welded to said twist beam.

10. A motor vehicle rear axle assembly comprising:

a generally U-shaped twist beam with first and second walls extending generally angularly outward, said twist beam being extended in a direction generally transverse to a longitudinal axis of a vehicle, and said first and second walls adjacent opposite ends of said twist beam having aligned apertures extending therethrough;

first and second control arms extending generally parallel with said vehicle longitudinal axis, said control arms having a first extreme end being adapted for pivotal mounting with said vehicle and said control arms being generally parallel spaced from one another and said control arms being fixably connected with said twist beam adjacent opposite extreme ends of said twist beam and extending through said apertures in said twist beam and being encircled by said twist beam first and second walls, said twist beam first and second walls being urged towards one another to allow for entry of said respective control arm through twist beam apertures and said twist beam first and second walls then being allowed to radially extend away from each other to mechanically lock said twist beam to said control arms.

11. A motor vehicle rear axle assembly as described in claim 10, wherein said control arms are additionally welded to said twist beam.

12. A method of connecting a motor vehicle rear axle assembly generally U-shaped twist beam having first and second walls to a control arm, said method comprising:

piercing a first aperture in a first wall of the twist beam;

piercing a second aperture in a second wall of the twist beam, said second wall being aligned with the first wall;

folding the first and second walls of the twist beam toward one another to bring the first and second walls toward one another;

inserting said control arm through said first and second apertures of said twist beam while said first and second apertures of said twist beam are folded toward one another; and relieving the folded condition of said twist beam to allow said first and second walls of said twist beam to extend outwardly from one another thereby locking said twist beam to said control arm and encircling said control arm.

13. A method of connecting a rear axle suspension twist beam to a control arm as described in claim 12, further including welding said control arm to said twist beam.

14. A method as described in claim 1, additionally comprising welding a bead of weld material to said beam between said first and second walls of said twist beam after said twist beam first and second walls have been relieved from the folded condition.

* * * * *